(12) United States Patent
Baiardi et al.

(10) Patent No.: US 6,495,789 B2
(45) Date of Patent: Dec. 17, 2002

(54) DEVICE AND METHOD FOR INTRODUCING A MACHINING ELECTRODE INTO A EDM MACHINE

(75) Inventors: Giorgio Baiardi, Locarno (CH); Peter Wehrli, Ascona (CH)

(73) Assignee: Agie SA, Losone (CH)

( * ) Notice: Subject to any disclaimer, the term of this patent is extended or adjusted under 35 U.S.C. 154(b) by 19 days.

(21) Appl. No.: 09/748,655

(22) Filed: Dec. 22, 2000

(65) Prior Publication Data

US 2002/0047538 A1 Apr. 25, 2002

(30) Foreign Application Priority Data

Dec. 28, 1999 (DE) .......................... 199 63 416

(51) Int. Cl.⁷ .............................. B23H 7/02
(52) U.S. Cl. ................ 219/69.12; 226/97.4
(58) Field of Search ................ 219/69.12, 69.11; 226/97.4, 91, 95; 205/651; 204/224 M, 225

(56) References Cited

U.S. PATENT DOCUMENTS

| | | | | |
|---|---|---|---|---|
| 4,172,544 A | * | 10/1979 | Pennings et al. | 226/97.4 |
| 4,366,845 A | * | 1/1983 | Simson | 226/97.4 |
| 4,465,915 A | | 8/1984 | Corcelle | 219/69.12 |
| 4,645,894 A | * | 2/1987 | Bonga | 219/69.12 |
| 4,813,460 A | * | 3/1989 | Van Bogaert | 226/97.4 |
| 5,340,958 A | | 8/1994 | Okazaki et al. | 219/69.12 |
| 6,045,023 A | | 4/2000 | Michard | 219/69.12 |

FOREIGN PATENT DOCUMENTS

| | | | | |
|---|---|---|---|---|
| CH | 644541 A | | 8/1984 | |
| DE | 3419944 C1 | | 11/1985 | |
| DE | 3014084 C2 | | 11/1986 | |
| DE | 3126444 C2 | | 7/1988 | |
| DE | 19607705 A1 | | 9/1997 | |
| EP | 3408173 A1 | | 5/1985 | |
| JP | 61-229776 A | * | 10/1986 | 226/97.4 |
| JP | 4-331023 A | | 11/1992 | 219/69.12 |
| JP | 5-92321 A | | 4/1993 | 219/69.12 |
| JP | 5-185322 | | 7/1993 | |

* cited by examiner

*Primary Examiner*—Geoffrey S. Evans
(74) *Attorney, Agent, or Firm*—Marshall, Gerstein & Borun

(57) ABSTRACT

A device for preparation of a machining electrode, especially a machining electrode or bar sinking electrode in an EDM machine for feed into an electrode guide system. The device employs a suction and advance device for suction and advance of the machining electrode and at least one pressure equalization device. Additionally, an electrode change device is disclosed having at least two devices for preparing the machining electrode and a method for preparation of a machining electrode.

27 Claims, 2 Drawing Sheets

DEVICE AND METHOD FOR INTRODUCING A MACHINING ELECTRODE INTO A EDM MACHINE

FIELD OF THE INVENTION

The present system concerns a device and method for introducing a machining electrode, especially a wire or bar sinking electrode to an electrode guide system oan electrical discharge machining (EDM) machine.

BACKGROUND OF THE INVENTION

EDM machines are used to machine work pieces by electric spark discharge between an electrically conducting work piece and a machining electrode. In particular, the work piece can be cut by means of a wire electrode or machine with a bar sinking electrode by boring or cavity sinking. In this case, in addition to ablation of the material particles of the work piece, the machining electrode itself is also ablated. As a result, new electrode material must continuously be supplied. For example, a wire electrode is unwound from a spool or a bar-like machining electrode and is guided through the work zone of the EDM machine in order to continuously supply new electrode material.

A new machining electrode must initially be prepared for feed and, in particular, brought to a position suitable for feed (hereafter referred to as "introduction of the machining electrode"). Corresponding preparation or introduction devices are described in EP 0 161 657 ("Device for guiding a wire or band-like cutting electrode on a machine tool") and in JP 5-185322 ("Electrical wire EDM machine"). In both cases, preparation is by hand.

There is a need to provide an improved device and an improved method for preparing a machining electrode, especially a wire electrode or bar sinking electrode of an EDM machine for feed into an electrode guide system.

OVERVIEW OF THE DISCLOSURE

The above need is met by the present system by using a device for introducing a machining electrode, especially a wire electrode or a bar sinking electrode to an electrode guide system of an EDM machine having at least one means of suction and advance to draw in and advance the machining electrode and at least one pressure equalization device to reduce a fluid pressure provided in front of the suction and advance device in the direction of electrode advance.

The above need is also met by the present system by using an electrode change device, which comprises at least two devices according to the teachings of the present system for preparation of the machining electrode, and is movable relative to an input element of the electrode guide system for alternating introduction of the corresponding machining electrode.

Further, the above need is a met by a method for introduction or preparation of a machining electrode (e.g, a wire electrode or a bar sinking electrode) to an electrode guide system of an EDM machine, in which a fluid is first injected between a main nozzle formed as outer nozzle and an inner nozzle. Next, an underpressure is produced by this fluid injection in a hole of the inner nozzle and a machining electrode is drawn in and the drawn-in machining electrode is advanced. The fluid pressure is then reduced in at least one pressure equalization device connected in front of the main nozzle.

Unlike the known devices and methods for preparing a machining electrode, the machining electrode of the present system can also be drawn in during threading into the preparation device. This is particularly advantageous for fine erosion wires (electrodes) that can scarcely be manipulated by hand without aid. Because of this, the area of application of EDM machines for novel uses is expanded and, the work demands for an operator are substantially reduced. Moreover, the pressure built up in the device at the entry of the device for drawing-in and advance of the machining electrode can be at least largely reduced by the pressure equalization or pressure relief device and undesired emergence of pressure-generating fluid thereby avoided at the input of the device.

According to a variant of the present system, the suction and advance device includes a main nozzle that is essentially aligned along a main axis. A fluid can be injected into the main nozzle. By injection of fluid into the main nozzle on its injection side, an underpressure that initially draws in the machining electrode can be generated and the drawn-in machining electrode then advanced. In this manner the suction and advance devices are implemented in particularly simple fashion. It is also possible to transport the machining electrode with the fluid used for the suction process through the electrode guide system of the EDM machine.

According to another variant, the main nozzle is an outer nozzle with an inner nozzle and a tapering flow gap running between the outer and inner nozzle. The fluid can be injected into a flow gap between the inner wall of the main nozzle and the outer wall of the inner nozzle. The machining electrode can initially be drawn in through the hole of the inner nozzle and then advanced.

The underpressure required for the suction process can therefore be generated particularly simply and effectively.

According to yet another variant, at least one relief chamber is arranged along the main axis in front of the entry to the hole facing away from the main nozzle as a pressure equalization device. The fluid flowing to the input of the device from this relief chamber can be taken off through a bypass after it has reduced its overpressure in the relief chamber. Relief chambers are particularly suited for pressure equalization. The fluid, if it escapes into the chamber, is dammed up there and loses flow energy, especially when the chamber is also preferably filled with fluid. The fluid is discharged from the device through the bypass of the relief chambers according to the pressure prevailing there. In this manner, the situation is avoided in which the fluid emerges in an undesired and uncontrolled fashion, for example, at the output of the device according to the invention.

In another variant the device includes two or more relief chambers. In principle, it is sufficient to use only one relief chamber. To largely avoid undesired fluid escape at the most tolerable possible cost, however, it is expedient to use two or more relief chambers arranged in sequence, which cause a cascade-like pressure reduction.

Fluid is also preferably dischargeable from the relief chambers through the bypasses essentially against gravity. In principle, it is possible to divert the fluid in any direction. This preferably occurs against gravity, but a situation occurs in which diversion only takes place if an overpressure develops in the chamber. That is, during advance of the machining electrode in the electrode guide system of the EDM machine, fluid will penetrate into the relief chamber owing to the counterpressure prevailing in the system. Since this occurs under a certain pressure or counterpressure, part of the fluid will traverse the relief chamber in a jet along the machining electrode. Another part, however, remains in the relief chamber so that this is filled with fluid. As soon as the relief chamber is filled with fluid, the fluid along the machining electrode is braked by the other fluid at rest, diverted and possibly swirled so that the fluid pressure in and behind the relief chamber is significantly reduced. As a result, the fluid pressure in the relief chamber will build up to an overpressure and convey fluid from the bypass against gravity.

In principle, discharge of fluid from the relief chambers could also be achieved with a bypass with gravity if this were to have a sufficiently narrow diameter, for example. However, the discharge of fluid from the relief chambers is achieved more simply and more effectively in the manner described above.

The separation devices make it possible, for example, to cut a wire-like machining electrode after preparation in the device. Since the machining electrode is generally fed from an endless roll, the cutting device is also required in order to be able to separate the machining electrode at the end of the unwinding process from a partial piece remaining on the roll or in any case outside of the electrode guide system without involvement of an operator.

BRIEF DESCRIPTION OF THE DRAWINGS

Additional features and advantages of the disclosed method and apparatus are further explained below with reference to the detailed description and the accompanying schematic drawings.

DETAILED DESCRIPTION OF THE PREFERRED EMBODIMENTS

Figure 1:
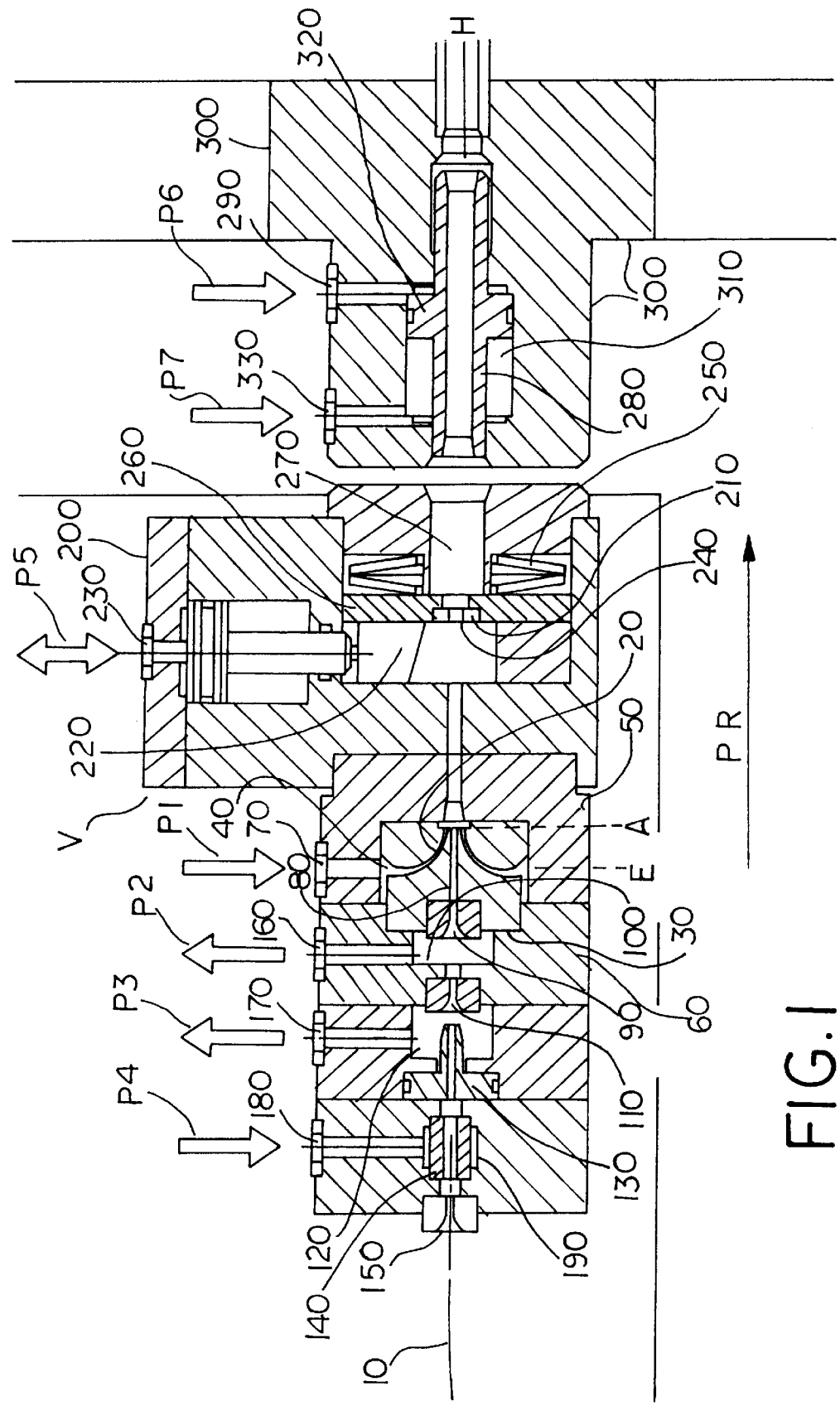
FIG. 1 shows a longitudinal section of a device constructed according to the teachings of the present system.

FIG. 1 illustrates a longitudinal section of an introduction or preparation device V in which a machining electrode 10 (e.g.,. a wire electrode or a bar microelectrode used for microcavity sinking machines with a cylindrical cross section or with a special microprofile) can be introduced. In the center region of device V, a nozzle 20 is situated (hereafter main nozzle 20) with an inlet region E (indicated by a dashed line) and an outlet region A (also indicated by a dashed line). The main nozzle 20 is arranged along a main axis H of the electrode preparation device V, which is also marked in FIG. 1 as a dashed line.

The main axis H then serves as an orientation aid in order to describe the position of individual components of the device V according to the invention relative to each other. In addition, a direction along the main axis H from outlet region A of nozzle 20 to inlet region E is defined (indicated by the direction arrow PR). This direction points in the running direction of the machining electrode.

The main nozzle is designed as an outer nozzle 20 in the form of a ring concentric to main axis H whose opening tapers along the main axis H from inlet region E to outlet region A. Tapering occurs so that the annular wall in the inner region of the ring has a convex cross section.

A complementary counterpiece or inner nozzle 30 is arranged in front of outer nozzle 20, which extends into the interior of outer nozzle 20. The inner nozzle 30 is also designed as a ring concentric to main axis H. Hole 80 has a constant cross section in the rear inner region. The outer wall of the ring tapers in this region toward the first nozzle 20.

Tapering occurs so that the annular wall on the outer region of the ring has a concave cross section. As a result, the inner nozzle 30 can be pushed into the outer nozzle 20.

The inner nozzle 30 is pushed into the outer nozzle 20 only far enough so that a flow gap 40 concentric to main axis H still remains between the concave outer wall of counterpiece 30 and the convex inner wall of outer nozzle 20. The flow gap 40 is bounded in the inlet region E of outer nozzle 20 additionally by a first housing 50 and a second housing 60 so that it is sealed outward in this region. In the outlet region A of outer nozzle 20, the flow gap 40, on the other hand, is opened outward.

A fluid (e.g., water) can be introduced to flow gap 40 via a first feed line 70 in inlet region E of outer nozzle 20. This is distributed over the flow gap 40 concentric to main axis H and flows (since the flow gap 40 is sealed outward in the inlet region E of outer nozzle 20) outward through the outlet region A of outer nozzle 20. As a result, an underpressure develops in the hole 80 of inner nozzle 30, which manifests itself in front of the inner nozzle 30 by a corresponding suction effect.

The front outlet of inner nozzle 30 is designed as a first suction nozzle 90. A first relief chamber 100 (whose function will be explained below), a second suction nozzle 110, a second relief chamber 120, an electrode guide 130, a clamping device 140 and a third suction nozzle 150 are situated in front of it. These components of the device V can be used for suction, advance and holding of the machining electrode 10.

For suction of the machining electrode 10, the clamping device 140 is placed in an open state (as shown). Then (or beforehand) a fluid, such as water, is fed through the first feed line 70 into flow gap 40. This is indicated by a first arrow P1.

The fluid flows to the outlet region A of the main nozzle 20 and in so doing causes an underpressure in the hole 80 and as a result also in the first relief chamber 100 and in the second relief chamber 120 (in this case bypasses 160 and 170 of the relief chambers, which will be described below are closed). A suction effect results from this underpressure in front of the third nozzle 150. If the machining electrode 10 is now brought into the vicinity of the third nozzle 150, it is drawn through the third suction nozzle 150, a clamping device 140, the electrode guide 130, the second relief chamber 120, the second suction nozzle 110, the first relief chamber 100, the first suction nozzle 90 and hole 80.

As soon as the machining electrode 10 reaches the outlet region A of the main nozzle 20 and, thus, comes in contact with the fluid, a sliding effect occurs instead of a suction effect. The sliding effect develops by friction forces between the flowing fluid and the machining electrode. The machining electrode 10 is then moved with the fluid behind the outlet of the main nozzle 20.

In this system state, the fluid is mostly diverted in the outlet direction PR of the main nozzle 20. Part of the fluid, however, is passed along the machining electrode 10 through hole 80 into the first and also the second relief chamber 100 and 120. Pressure buildup in the relief chambers 100 and 120 results, pressure being stronger in the first relief chamber 100 than in the second relief chamber 120. To reduce this pressure again, the first bypass 160 and the second bypass 170 are opened. This is indicated by a second and third arrow P2 and P3. In principle, it is also possible to use only one relief chamber.

As soon as the machining electrode has been advanced far enough according to the application, supply of fluid is stopped. The clamping device 140 is closed beforehand, at the same time or afterward, in order to secure the machining electrode 10 in the reached position.

The clamping device 140 consists, for example, of a vulcanized rubber ring that is enclosed by a first pressure chamber 190. A fluid, such as air, is introduced to this first pressure chamber 190 to close the clamping device 140 (this is indicated by a fourth arrow P4). The vulcanized rubber ring is deformed because of introduction of the fluid to the first pressure chamber 190 so that the machining electrode 10 is clamped.

A cutting device 200 is arranged behind main nozzle 20. The cutting device 200 contains an annular cutting edge 210, which is arranged concentric to main axis H, and a cutting edge 220 that can be moved relative to annular cutting edge 210 and perpendicular to main axis H. The cutting edge 220 is moved back and forth hydraulically, using of a double-acting piston actuated by-either pressure feed or pressure withdrawal (indicated by a fifth arrow P5) through a third feed and discharge line 230. However, mechanical drive devices or combinations of a piston and a spring, for example, are also conceivable. When the machining electrode 10 is passed through the annular cutting edge 210 and the cutting edge 220 is then moved downward to main axis H, the machining electrode 10 is cut at cutting point 240.

The cutting device 200 also includes a disk spring 250. The disk spring 250 presses a holding plate 260 in which the annular cutting edge 210 is mounted, and along which the cutting edge 220 is guided, against cutting edge 220. This prevents a gap from forming between the annular cutting edge 210 and the prism-shaped cutting edge 220. This is important, since otherwise there is a hazard that the cutting site will be fouled or the machining electrode 10 kinked instead of cut. In principle, this can also be guaranteed by very precise guiding of the prism-like cutting edge 220. However, the variant with the disk spring 250 is more cost effective.

As an alternative to the described mechanical cutting device, any other cutting device can be used instead. In particular, devices for electrode separation by stretching, stretching and heating, and/or melting of the electrode will be conceivable.

The cutting device 200 is needed to cut the machining electrode 10 after preparation in the device V. Since the machining electrode 10 is generally supplied from an endless roll, the cutting device 200 is also needed to separate the machining electrode at the end of the unwinding process from a partial piece remaining on the roll or, in any event, outside of the electrode guide system.

In the center region of the disk spring 250 and behind it, there is a connection opening 270. A tubular connection element 280 can be introduced into this connection opening 270, which is connected to move with an inlet element 300 of an additional electrode guide. In this manner it is possible to connect the previously described device V to an electrode guide. As an alternative, it is also possible to design the tubular connection element as part of the device V previously described and provide a connection opening in the region of the additional electrode guide.

The tubular connection element 280 is mounted to move in a second pressure chamber 310 in the additional electrode guide along the main axis H and relative to the second pressure chamber 310. The second pressure chamber 310 is arranged concentric to main axis H. A piston 320 is provided on tubular connection element 280, which is sealed with the wall of the second pressure chamber 310 and therefore divides it into two partial regions. A fourth feed line 290 is arranged behind piston 320 and therefore discharges in the rear partial region. A fifth feed line 330 is arranged in front of piston 320 and therefore discharges in the front partial region.

When a fluid is fed through the fourth feed line 290 behind piston 320 into the rear partial region of the second pressure region 310, the piston 320 and the tubular connection element 280 are moved forward (i.e., leftward in FIG. 1) and the tubular connection element 280 is introduced to the connection opening 270 (indicated by a sixth arrow P6). On the other hand, when fluid is fed into the fifth feed line 330 in front of piston 320 into the front partial region of the second pressure chamber 310, the piston 320 and the tubular connection element 280 are moved back (i.e., rightward in FIG. 1) and the connection is released again (indicated by a seventh arrow P7).

Figure 2:
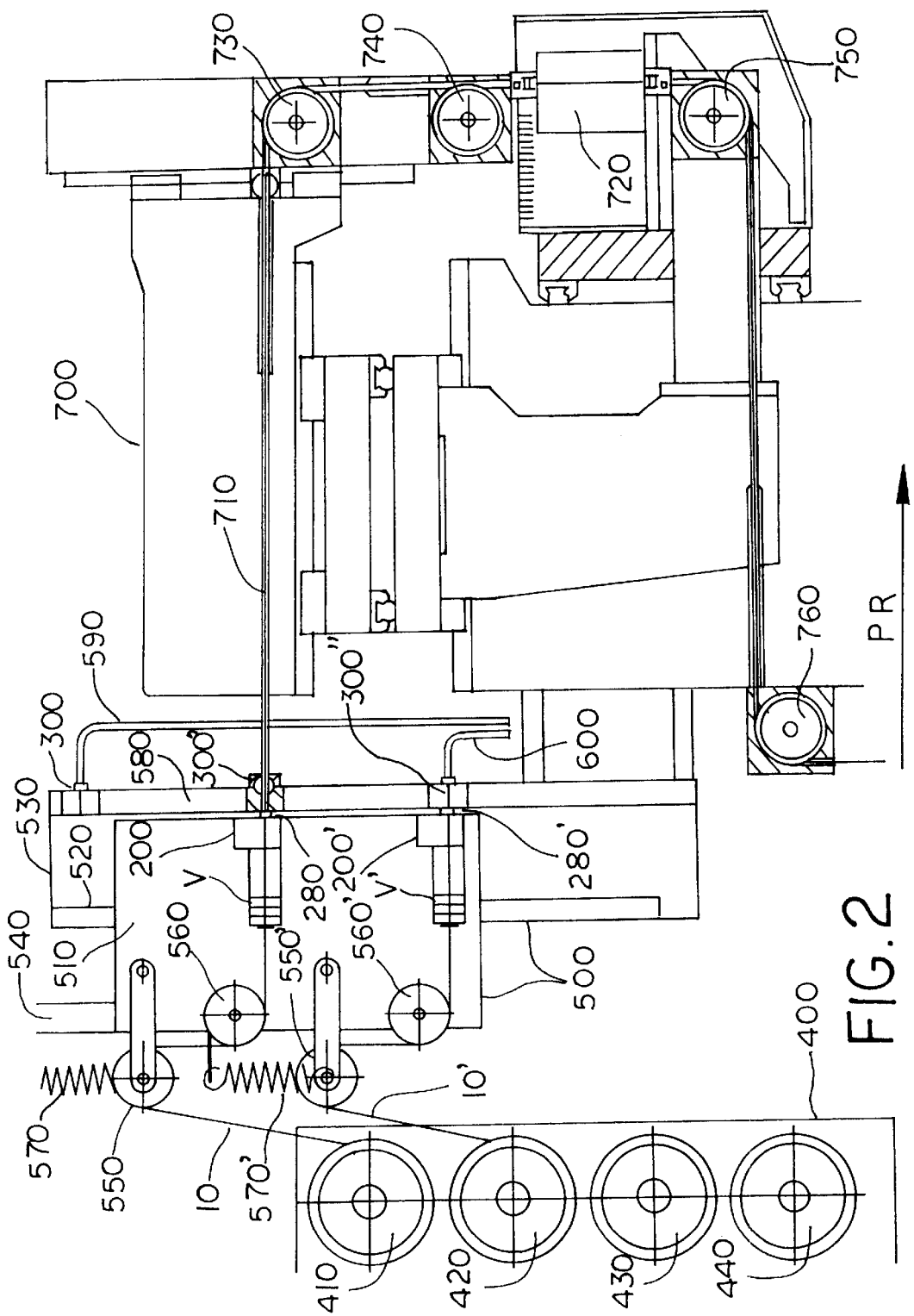
FIG. 2 shows a longitudinal section through a schematic view of an EDM machine in which the device constricted according to the teachings of the present system illustrated in FIG. 1 is implemented.

FIG. 2 shows a section through a schematic depiction of an EDM machine in which the device illustrated in FIG. 1 is implemented twice. Specifically, a supply vessel for electrode coils 400, an electrode preparation and electrode change unit 500 and the actual EDM machine 700 are arranged in FIG. 2.

The supply vessel for electrode coils 400 comprises in this example four electrode coils 410, 420, 430 and 440. Coils with electrodes of the same thickness can be involved. A machining electrode with completely different properties (different materials or qualities) can likewise be used. Finally, bar electrodes can be stocked instead of electrode coils.

The first machining electrode 10 is partially unwound from the first coil 410 and the second machining electrode 10' from the second coil 420 and threaded into components of the electrode preparation and electrode change unit 500. The third and fourth electrode coils 430, 440 are available as supply.

The electrode preparation and electrode change unit 400 comprises two devices V and V'. The devices V and V' are arranged with horizontally running main axes (not shown) on a traversing element 510 which can be moved relative to the actual EDM machine 700 and perpendicular to the horizontally running main axes. For this purpose, the traversing element 510 is arranged to move on a vertically running rail 520, which in turn is fastened to a frame 530. Positioning of the traversing element 510 is carried out with drive devices (not shown) via a drive element 540.

Two rolls 560 and 550 and 550' and 560' are arranged in front of each of the devices V and V', the first of which is suspended on a spring element 570 and 570'. The first machining electrode 10 is guided oppositely around the first pair of rolls 550 and 560 (i.e., first clockwise around the first roll 550 and then counterclockwise around the second roll 560). The second machining electrode 10' is guided oppositely around the second pair of rolls 550' and 560'. From there, the first machining electrode 10 is threaded into the first device V and the second machining electrode 10' into the second device V'.

Behind the traversing element 510 three inlet elements 300, 300' and 300" from three electrode guides are arranged vertically one above the other in a mount 580 running parallel to rail 520 and rigidly connected to frame 530. The middle inlet element 300' is the inlet element of the electrode guide 710 of the actual EDM machine 700. The upper inlet element 300 and the lower inlet element 300", on the other hand, are only connected to electrode disposal lines 590 and 600, which serve for discharge of fluid from the first feed line 70 and 70' of the devices V and V' and discharge of electrode residues.

The traversing element 510 is shown in FIG. 2 in a first position in which the first device V is connected to the middle inlet element 300' of the electrode guide 710 of the actual EDM machine 700 via a first tubular connection element 280. At the same time, the second device V' according to the invention is connected to the lower inlet element 300" of the lower electrode disposal line 600 via a second tubular connection element 280'.

The traversing element 510 can be moved vertically into a second position (not shown) along rail 520 via the drive element 540. For this purpose, machining electrodes 10 and 10' running through the devices V and V' and the corresponding inlet elements of the first position of the traversing element 510 must optionally be cut by the cutting devices 200 and 200'. Before this, at the same time or afterward, the tubular connection elements 280 and 280' can be opened. As soon as this has occurred, the traversing element 510 can be moved along rail 520. Displacement occurs so that the first device V is positioned in front of the upper inlet element 300 of the first electrode disposal line 590 and the second device V' is positioned in front of the middle inlet element 300' of the electrode guide 710 of the actual EDM machine 700. The devices V and V' are then connected to the corresponding opposite inlet elements 300 and 300'. Arbitrary back and forth replacement can occur between the two positions of the traversing element 510.

In the depicted first position of the traversing element 510, the first machining electrode 10 is threaded from the first roll 410 through the first device V and the center inlet element 300' into the electrode guide 710 of the actual EDM machine. From there, it is passed through the actual EDM machine 700 (as described in detail below). As a result, machining of a work piece 720 occurs with the first machining electrode 10.

The second machining electrode 10' is already prepared, (i.e., threaded into the second device V') as described above. During the threading process, the fluid fed through the first feed line 70' (shown as 70 in FIG. 1) is diverted via the second tubular connection element 280', the lower inlet element 300" and the lower electrode disposal line 600. To ensure that the machining electrode 10' (or 10) ends at the connection opening 270' (or 270) with conclusion of the threading process, the machining electrode 10' is initially threaded too far and then, when it can already be seen in the lower electrode disposal line 600 or emerges from it, is cut with the cutting device 200' at cutting point 240. The separated electrode end is disposed of with the fluid from the first feed line 70' via the lower electrode disposal line 600. An additional or alternative use of electrode sensors (not shown) is also conceivable. In this manner, an electrode change can be conducted with limited time loss. The actual EDM machine 700 can also be operated for a relatively long period in the absence of an operator.

In the depicted first position of the traversing element 510 the first machining electrode 10 is guided through the middle inlet element 300', the electrode guide of the actual EDM machine 710, a first reversing roll 730, a second reversing and braking roll 740, through the work piece 720 around a third reversing roll 750 and around a take-off 760. The machining electrode 10 during threading into the tubular electrode guide 710 of the actual EDM machine 700 is then transported up to work piece 720 by the fluid from the first feed line 70 of the first device V. It is expedient here to provide the end of the tubular electrode guide 710 facing the work piece with a wide opening in order to avoid backup. On the other hand, since during operation of the actual EDM machine 700 a small opening is regularly required after the threading process at this site to produce a jet, this can be achieved by a bypass valve.

In operation of the system of FIG. 2, the machining electrode 10 or 10' is drawn in, clamped and cut for preparation. For suction, the device V is connected to one of the electrode disposal lines 590 or 600 and brought into a preparation position in so doing. The first and second bypasses 160 and 170 are closed, the clamping device 140 is opened and the cutting device 220 is also opened. The tubular connection element 280 is connected by pressure feed to the fourth feed line 290. Fluid is then fed via the first feed line 70. In particular, in the preparation position a limited counterpressure prevails at the outlet, since the electrode disposal lines 590 and 600 are relatively short tube pieces (in another position, the limited counterpressure must optionally be guaranteed in some other way). As a result, a particularly high flow rate can be achieved in the outlet region A of main nozzle 20. This again means that a particularly strong suction effect develops at the inlet of the third nozzle 150.

For automatic electrode change, the old machining electrode 10 or 10' is initially separated. The tubular connection element 280 or 280' is brought back by pressure feed in the fifth feed line 330. The entire traversing element 510 is displaced with the electrode preparation units V and V' so that the new machining electrode 10 or 10' enters the electrode feed line 710. The first and second bypasses 160 and 170 are opened, the clamping device 140 is opened and the cutting device 220 is also opened. The connection elements 280 and 280' are now reconnected in the loading position by pressure feed on the fourth feed line 290. Fluid is then again fed via the first feed line 70. In the region of the work head (above work piece 720), a relief valve (not shown) is present, which is opened during automatic electrode change in order to avoid a large pressure drop on the threading nozzle. In this manner the required volume flow can be generated for advance of the machining electrode 10 or 10' through the feed part of the actual EDM machine.

Automatic threading of the machining electrode 10 or 10' in the work zone in the region of work piece 720 occurs in similar fashion to the threading process during an automatic electrode change. However, for this region the relief valve is closed on the work head in order to produce the full pressure for the threading jet.

The disclosed EDM machine can be used in different ways. On the one hand, it is possible to automatically perform an electrode change after consumption of a first electrode roll. On the other hand, the electrode change can occur in order to conduct machining of one (or more) work pieces automatically in succession with different electrode types. There is also the possibility of expanding these operating capabilities by a larger number of devices according to the invention.

Although certain apparatuses constructed in accordance with the headings of the presently disclosed system have been described herein, the scope of coverage of this disclosure is not limited thereto. On the contrary, this patent covers all embodiments of the teachings of the presently disclosed method and apparatus fairly falling within the scope of the appended claims either literally or under the doctrine of equivalents.

What is claimed is:

1. A device for introducing a machining electrode to an electrode guide system of an electric discharge machine, the device comprising:

a) at least one suction and advance device configured for suction and advance of the machining electrode; and b) at least one pressure equalization device provided in an electrode advance direction at an input portion of the suction and advance device to reduce a fluid pressure.

2. The device as defined in claim 1, further comprising:
the suction and advance device having a main nozzle that is aligned essentially along a main axis; and
a fluid injected into the main nozzle;
wherein injection of the fluid into the main nozzle initially generates an underpressure on an injection side that draws in the machining electrode, which causes advancement of the machining electrode.

3. The device as defined in claim 2, further comprising:
the main nozzle having an outer nozzle with an inner nozzle and a tapering flow gap that runs between the outer and inner nozzles;
wherein the fluid is injectable into the flow gap between an inner wall of the main nozzle and an outer wall of the inner nozzle; and
wherein the machining electrode is initially drawn into and then advanced through a hole of inner nozzle.

4. The device as defined in claim 3, wherein an inlet of the hole facing away from the main nozzle is configured as a first suction nozzle.

5. The device as defined in claim 4 further comprising:
at least one relief chamber arranged substantially along the main axis in front of the inlet of the hole facing away from main nozzle and serving as the at least one pressure equalization device;
wherein the fluid is withdrawable from the at least one relief chamber through at least one bypass.

6. The device as defined in claim 5 further comprising two relief chambers.

7. The device as defined in claim 5 wherein the fluid is capable of being withdrawn from the at least one relief chamber through the at least one bypass against the force of gravity.

8. The device as defined in claim 5 further comprising at least one holding mechanism configured to hold the machining electrode.

9. The device as defined in claim 8, wherein the at least one holding mechanism is arranged essentially along the main axis and disposed next to a portion of the at least one relief chamber.

10. The device as defined in claim 8 further comprising:
the at least one holding mechanism is configured as a ring comprising an elastically deformable material; and
the machining electrode is passable through the ring.

11. The device as defined in claim 8 wherein the at least one holding mechanism comprises vulcanized rubber.

12. The device as defined in claim 8, further comprising:
the at least one holding mechanism is settable to at least one of an opened and closed state;
wherein the closed state is attached by compressing the at least one holding mechanism; and
wherein the at least one holding mechanism is compressible by supplying a fluid.

13. The device as defined in claim 8, further comprising:
a third suction nozzle disposed substantially along the main axis at a portion of the at least one holding mechanism.

14. The device as defined in claim 1, further comprising:
one or more separation devices configured for cutting the machining electrode, the one or more separation devices arranged substantially along the main axis at an outlet protion of the main nozzle.

15. The device as defined in claim 14 wherein the one or more separation devices include one or more mechanical cutting devices.

16. The device as defined in claim 15 where in the one or more a cutting devices are movable by supply and discharge of a fluid.

17. The device as defined in claim 14 wherein the one or more separation devices include at least one a of heating device and a stretching device.

18. The device as defined in claim 14 further comprising:
one or more spring devices arranged substantially along the main axis adjacent to the one or more separation devices; and
wherein the one or more spring devices are configured to press a holding plate in which a first cutting element is rigidly arranged against another cutting element, which is movable relative to the first cutting element and the holding plate.

19. The device as defined in claim 18 wherein the one or more spring devices are disk springs.

20. The device as defined in claim 18 wherein the device is movable relative to an electrode guide system.

21. The device as defined in claim 20 further comprising:
a connection opening for an inlet portion of the electrode guide system that is disposed substantially along the main axis in a middle region of the one or more spring devices.

22. The device as defined in claim 21 wherein a connection element connected to the inlet portion is introducible to a connection opening disposed substantially along main axis.

23. The device as defined in claim 22 wherein the connection element is movably connected to inlet portion.

24. The device as defined in claim 22 wherein the connection element is movable relative to the electrode guide system by supply of a fluid.

25. The device as defined in claim 24 wherein the fluid is injected into main nozzle and correspondingly advances the machining electrode in the electrode guide system when the device and the electrode guide system are connected via the connection element.

26. An electrode changing device, comprising:
at least two devices each configured to introduce a corresponding machining electrode by using at least one suction and advance device configured for suction and advance of the machining electrode and at least one pressure equalization device configured to reduce fluid pressure; and
wherein each of the at least two devices are movable relative to an inlet element of an electrode guide system for alternating feed of the corresponding machining electrode into the electrode guide system.

27. A method for introducing a machining electrode into an electrode guide system of an electric discharge machine, the method compromising the steps of:
a) injecting a fluid between an outer nozzle and an inner nozzle of a main nozzle;
b) generating an underpressure in a hole of the inner nozzle through injection of the fluid such that a machining electrode is drawn in to the main nozzle and advanced; and
c) reducing fluid pressure in at least one pressure equalization device connected to an input portion of the main nozzle.

* * * * *

UNITED STATES PATENT AND TRADEMARK OFFICE
CERTIFICATE OF CORRECTION

PATENT NO.    : 6,495,789 B2
DATED         : December 17, 2002
INVENTOR(S)   : Giorgio Baiardi et al.

It is certified that error appears in the above-identified patent and that said Letters Patent is hereby corrected as shown below:

Column 9,
Line 67, delete "protion" and insert -- portion --.

Column 10,
Line 4, delete "where in" and insert -- wherein --.
Line 8, delete "a of" and insert -- of a --.

Signed and Sealed this

Twelfth Day of August, 2003

JAMES E. ROGAN
*Director of the United States Patent and Trademark Office*